United States Patent
Ayzenberg et al.

(10) Patent No.: US 8,503,814 B2
(45) Date of Patent: Aug. 6, 2013

(54) METHOD AND APPARATUS FOR SPECTRUM ESTIMATION

(75) Inventors: Oscar Ayzenberg, Cupertino, CA (US); Vlad Fruchter, Los Altos, CA (US)

(73) Assignee: CSR Technology Inc., Sunnyvale, CA (US)

( * ) Notice: Subject to any disclaimer, the term of this patent is extended or adjusted under 35 U.S.C. 154(b) by 784 days.

(21) Appl. No.: 12/637,526

(22) Filed: Dec. 14, 2009

(65) Prior Publication Data

US 2010/0183238 A1    Jul. 22, 2010

Related U.S. Application Data

(60) Provisional application No. 61/145,684, filed on Jan. 19, 2009.

(51) Int. Cl.
*G06K 9/40* (2006.01)

(52) U.S. Cl.
USPC .......... 382/261; 382/168; 382/172; 382/254; 382/266; 382/270

(58) Field of Classification Search
USPC ............. 382/168, 171–173, 254, 260, 261, 382/263, 266, 270, 274
See application file for complete search history.

(56) References Cited

U.S. PATENT DOCUMENTS

| | | | |
|---|---|---|---|
| 4,908,875 A * | 3/1990 | Assael et al. | 382/272 |
| 5,583,659 A * | 12/1996 | Lee et al. | 382/273 |
| 5,594,807 A * | 1/1997 | Liu | 382/168 |
| 5,828,771 A * | 10/1998 | Bloomberg | 382/112 |
| 5,880,767 A | 3/1999 | Liu | |
| 6,256,179 B1 | 7/2001 | Yamada et al. | |
| 6,600,518 B1 | 7/2003 | Bakhmutsky et al. | |
| 6,614,930 B1 * | 9/2003 | Agnihotri et al. | 382/173 |
| 6,667,815 B1 | 12/2003 | Nagao | |
| 6,717,622 B2 | 4/2004 | Lan | |
| 6,771,835 B2 | 8/2004 | Han et al. | |
| 6,795,585 B1 | 9/2004 | Parada et al. | |
| 6,847,738 B1 | 1/2005 | Scognamiglio et al. | |
| 6,862,368 B1 | 3/2005 | He et al. | |
| 6,898,319 B1 | 5/2005 | Hazra et al. | |
| 7,006,704 B2 | 2/2006 | Kobayashi et al. | |
| 7,176,983 B2 | 2/2007 | Chiang et al. | |
| 7,283,680 B2 | 10/2007 | Cheng | |
| 7,336,844 B2 * | 2/2008 | Pike et al. | 382/254 |
| 7,408,590 B2 | 8/2008 | Huang et al. | |
| 7,421,127 B2 | 9/2008 | Bruls et al. | |
| 7,483,081 B2 | 1/2009 | Wu | |
| 8,009,908 B2 * | 8/2011 | Yago | 382/170 |
| 8,031,961 B2 | 10/2011 | Nachlieli et al. | |
| 2005/0041883 A1 | 2/2005 | Maurer et al. | |

(Continued)

*Primary Examiner* — Eric Rush
(74) *Attorney, Agent, or Firm* — Lando & Anastasi, LLP

(57) ABSTRACT

An apparatus and methods are provided for determining control parameters for image enhancement. In one embodiment a method for determining control parameters includes receiving image data for a first frame and calculating an adaptive threshold value based on the image data. The method includes determining a pixel slope distribution for a pixel window of the image data, wherein the pixel window is selected based on the adaptive threshold value and determining a spectrum estimation coefficient based on the pixel distribution, wherein the spectrum estimation coefficient is determined based on the spectral components of the image data. The method may then include determining one or more control parameters for enhancement of the image data based on the spectrum estimation coefficient, wherein the one or more control parameters relate to filtering parameters for adaptive enhancement of image data.

20 Claims, 7 Drawing Sheets

U.S. PATENT DOCUMENTS

| | | |
|---|---|---|
| 2006/0017773 A1 | 1/2006 | Sheraizin et al. |
| 2006/0181644 A1 | 8/2006 | De Haan |
| 2006/0279660 A1 | 12/2006 | Ali |
| 2006/0285766 A1 | 12/2006 | Ali |
| 2007/0139563 A1 | 6/2007 | Zhong |
| 2007/0139568 A1 | 6/2007 | Zhong et al. |
| 2008/0211959 A1 | 9/2008 | Balram et al. |
| 2008/0267524 A1 | 10/2008 | Shaked et al. |
| 2009/0028458 A1 | 1/2009 | Teng et al. |
| 2009/0087120 A1 | 4/2009 | Wei |
| 2010/0189373 A1 | 7/2010 | Ayzenberg |

* cited by examiner

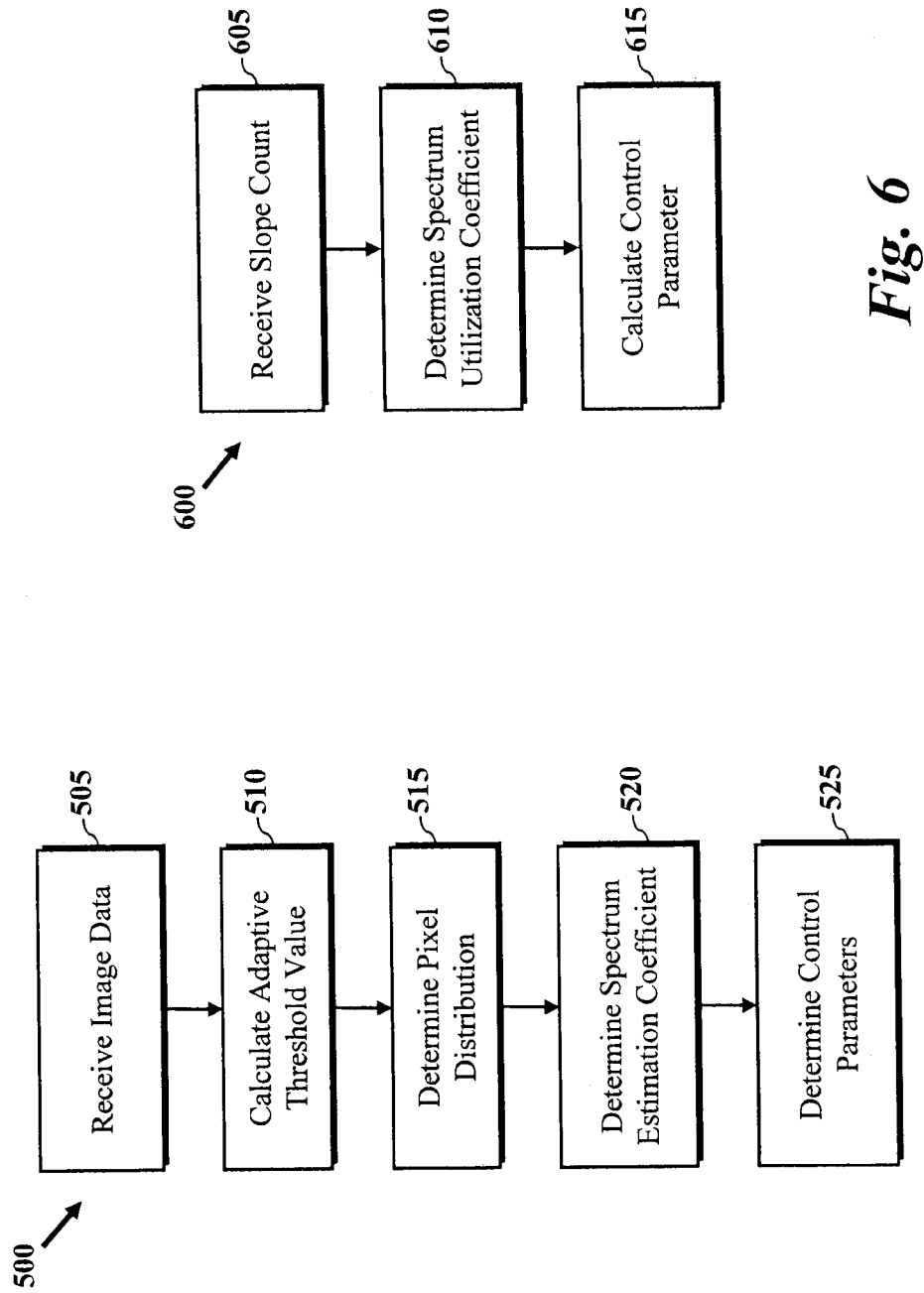

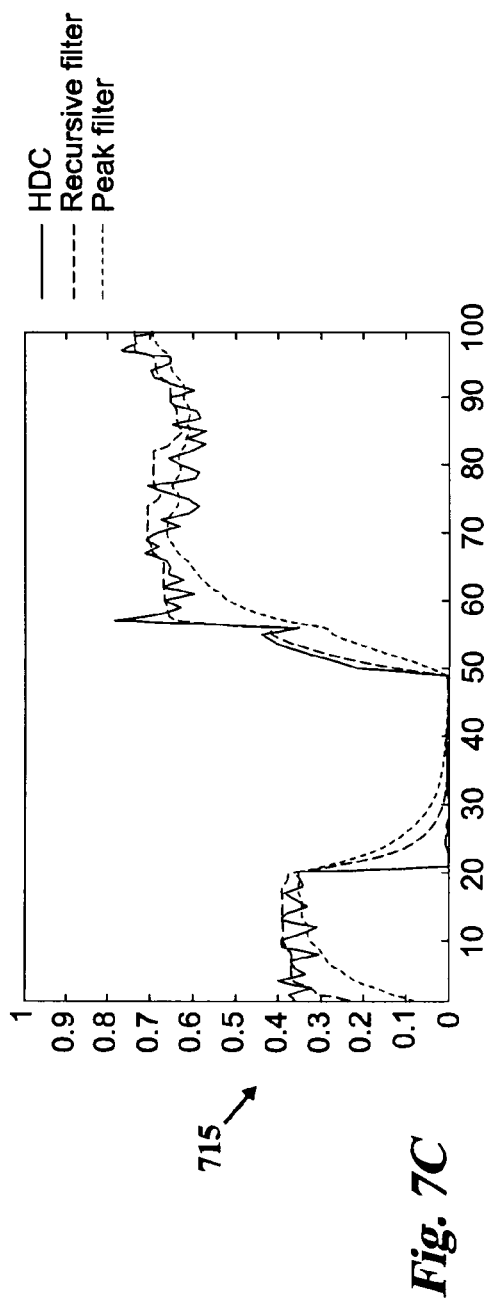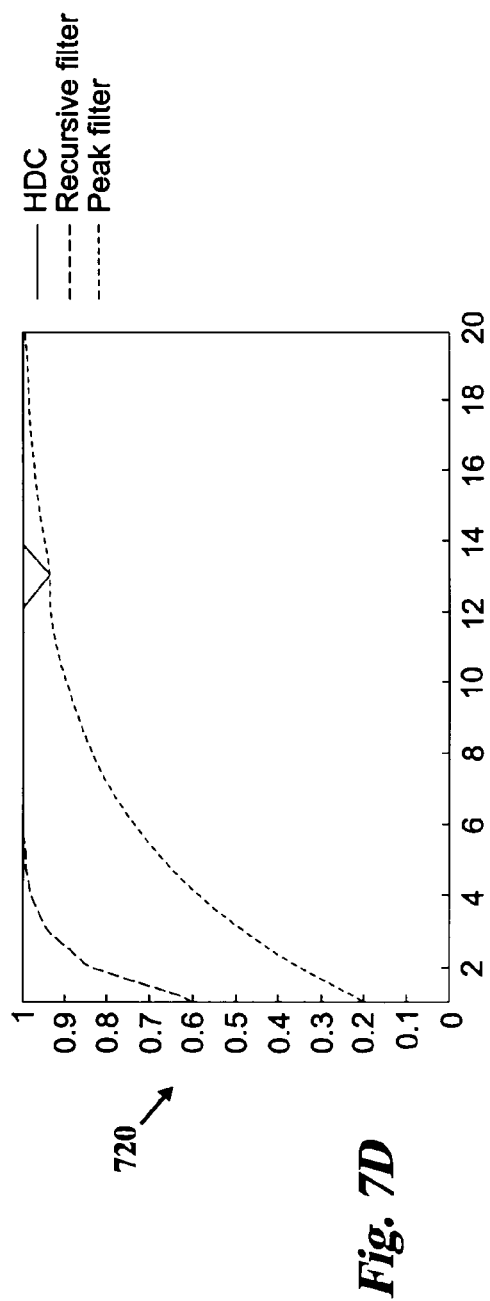
*Fig. 7C*
*Fig. 7D*

METHOD AND APPARATUS FOR SPECTRUM ESTIMATION

CROSS-REFERENCE TO RELATED APPLICATION

This application claims the benefit of U.S. Provisional Application No. 61/145,684, filed on Jan. 19, 2009, which is hereby fully incorporated by reference.

This application is related to concurrently filed application entitled, "Method and Apparatus for Content Adaptive Sharpness Enhancement" which is hereby fully incorporated by reference.

FIELD OF THE INVENTION

The present invention relates in general to processing image data and more particularly to providing control parameters for enhancement of image data.

BACKGROUND OF THE INVENTION

Perceived sharpness of displayed images is an important parameter in defining picture quality. Many devices utilize sharpness enhancement to optimize visual display of image data. There are several techniques for improving sharpness. The conventional methods of sharpness enhancement typically assume that received image data relates to full spectrum, for example data satisfying the Nyquist frequency. However, in many cases received image data may be sub-optimal. For example, one cause of spectrum reduction in image data may be due to upscaling of lower definition video sources (e.g., 480 p resolution such as video format) to a high-definition format. As a result, sharpness enhancement performed on the image data without knowledge of the incoming image data spectrum can render sharpness enhancement of the image data ineffective. The conventional methods and devices for image enhancement, however, do not address spectrum of the input image data.

For display devices in particular, such as digital televisions, sharpness enhancement has become an important issue. Quite often, standard definition (SD) video and television (SDTV) sources may be upscaled and broadcast as high definition (HD) programming. Many of the conventional techniques apply static sharpness settings usually based on an assumption that signal quality matches picture resolution and thus, disregard upscaled image data. In this particular case, the conventional techniques for sharpness enhancement based on the received imaged data will not produce the desired effect. Conventional techniques of contrast enhancement further do not address the presence of artifacts in broadcast image streams, nor the presence of HD graphics (e.g., logos) overlaid on broadcast image data.

Thus, there is a need in the art for systems and methods of spectrum estimation of image data and determination of sharpness enhancement control parameters.

BRIEF SUMMARY OF THE INVENTION

Disclosed and claimed herein, are an apparatus and methods for determining control parameters for image enhancement. In one embodiment, a method includes receiving image data for a first frame, calculating an adaptive threshold value based on the image data, and determining a pixel slope distribution for a pixel window of the image data, wherein the pixel window is selected based on the adaptive threshold value. The method further includes determining a spectrum estimation coefficient based on the pixel distribution, wherein the spectrum estimation coefficient is determined based on the spectral components of the image data, and determining one or more control parameters for enhancement of the image data based on the spectrum estimation coefficient, wherein the one or more control parameters relate to filtering parameters for adaptive enhancement of image data.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 5 depicts a process for determining one or more control parameters according to one embodiment of the invention;

FIG. 6 depicts a process for calculating a control parameter according to one embodiment of the invention; and FIGS. 7A-7D depict graphical representations of control parameters based on the pixel distributions of FIGS. 3A-3D according to one or more embodiments of the invention.

DETAILED DESCRIPTION OF THE EXEMPLARY EMBODIMENTS

One aspect of the present invention relates to methods and apparatus for determining control parameters for image enhancement, such as content adaptive sharpening (CAS) of image data. In one embodiment, control parameters may be determined for particular types of image data in order to provide adaptive sharpness enhancement. One or more control parameters may be determined by analyzing input image data in order to detect upscaling of image data, and a scaling factor. In one embodiment a method for determining control parameters includes determining an adaptive threshold value for the image data, which may relate to one of upscaled standard definition image data to partial high definition (e.g., 1280×720) and full high definition (e.g., 1920×1080) image data. The spectral content of received image data may be analyzed to estimate an original resolution. The method may further include determining a spectrum estimation coefficient based on the adaptive threshold value. One or more control parameters for adaptive sharpness enhancement may be determined based on the spectrum estimation coefficient. In that fashion, spectral components of image data may be analyzed to provide one or more control parameters for adaptive sharpness enhancement of image data.

In another embodiment, a device may be provided including a slope analyzer module and adaptive threshold module configured to calculate a distribution of the image data. The device may be configured to estimate the image data spectrum and generate an appropriate control signal for sharpness enhancement. The methods and apparatus as disclosed herein may provide output to a content adaptive sharpening (CAS) module according to one or more embodiments.

Description of the Exemplary Embodiments

Figure 1:
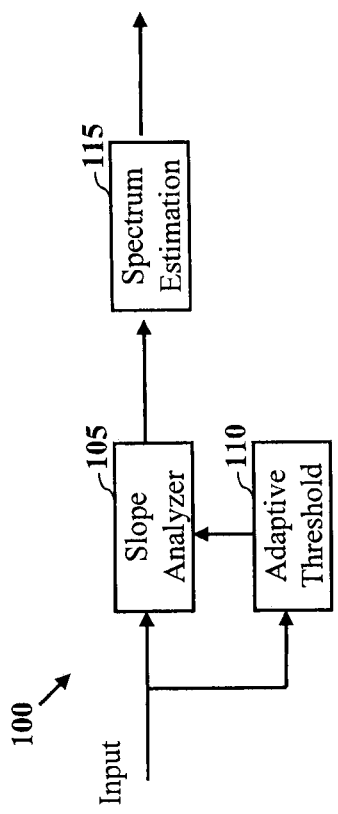
FIG. 1 depicts a simplified block diagram of a spectrum analyzer according to one or more embodiments of the invention.

Referring now to the figures, FIG. 1 depicts a simplified block diagram of a spectrum analyzer according to one or more embodiments of the invention. For optimum performance of sharpness enhancement of image data, image spectrum of received image data may be determined by spectrum analyzer 100. Accordingly, spectrum analyzer 100 may be configured to produce one or more parameters which may be employed by an adaptive sharpness enhancement device according to one or more embodiments of the invention. Spectrum analyzer 100 may be configured to receive image data as input. Exemplary input to the system includes, but is not limited to, quarter video graphics array (QVGA), encoded image and/or movie data (e.g., YUV422), compressed images (e.g., Y-only downscaled copies), standard definition (SD) and high definition (HD) image data. In one embodiment, input to spectrum analyzer 100 may be a high definition feed which may include upscaled image data, such as upscaled SD image data. Based on the received image data, slope analyzer 105 can calculate a pixel slope distribution of the image data.

Slope analyzer 105 may be configured to determine image quality of received image data. In one embodiment, the pixel slope distribution may relate to a histogram of fast and slow edges of a horizontal or vertical window of the image data. One pixel apart and two pixel apart slopes may respectively relate to fast and slow edges. When SD image data is upscaled by a multiple of 2.25 (e.g., from 480 to 1080), fast edges become slow edges and slow edges become slower edges (e.g., >4 pixel s apart). Similarly, fast edges become 1.5 pixel edges and slow edges become 3 pixels when upscaling SD to 720p, or 720 to 1080. Therefore, the percentage of both fast and slow edges in the upscaled image data may be expected to significantly decrease.

Adaptive threshold module 110 may similarly receive the image data of a first frame and may further be configured to calculate a dynamic threshold reflecting image detail and a dynamic range of the image data. An adaptive threshold value may be provided by adaptive threshold module 110 to slope analyzer 105 for determination of one or more pixel windows.

Slope analyzer 105 may be configured to provide a pixel slope distribution of pixel slopes to spectrum estimation module 115. Slope, or gradient measurements, relate to time domain measurements based on the detection of the highest slope in the image signal and distribution of various slopes. Based on the slope data, spectrum estimation module 115 may be configured to process the distribution to estimate spectral components of the image data. Based on the spectrum estimation, the spectrum analyzer 100 may characterize received image data as one or more types of image input. Exemplary image input types are listed in Table 1 below. Based on the estimated spectrum, spectrum estimation module 115 may produce one or more spectrum estimation coefficients.

TABLE 1

| Input | Mode | Spectrum (% of maximum) |
| --- | --- | --- |
| CVBS | NTSC over the air | 62% (4.2 MHz of 6.75 MHz) |
|  | PAL over the air | 62% (4.2 MHz of 6.75 MHz) |
|  | CVBS video generated locally (i.e., STB or DVD player) | 62% (4.2 MHz of 6.75 MHz) |
| ATSC | Dull HD | 100% |
| HDMI | 1.50x (480 lines → 720, 720→ 1080) | 66% |
| YPbPr | 2.25x (480 lines → 1080) | 44% |

It should be appreciated that the functions of the units of spectrum analyzer 100 may be implemented in a variety of ways including hardware, firmware, software, and combinations thereof.

Figure 2:
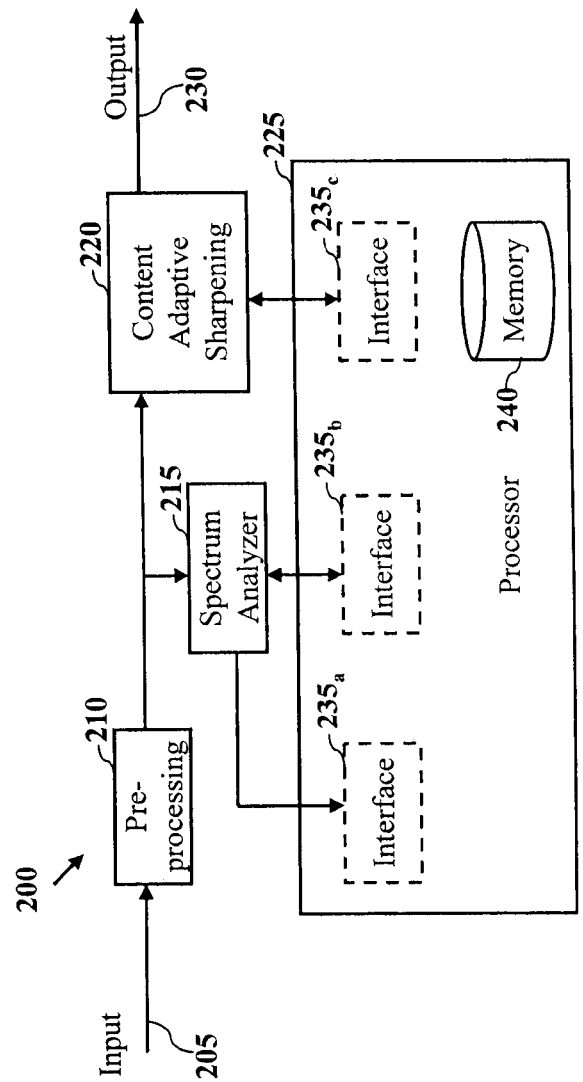
FIG. 2 depicts a simplified block diagram of image processing system according to one embodiment of the invention.

Referring now to FIG. 2, a simplified block diagram is shown of an image processing system according to one embodiment of the invention. System 200 may be configured to provide adaptive enhancement of image data. Image data received by input 205 of system 200 maybe pre-processed at block 210. In one embodiment, pre-processing functions at block 210 may relate to one or more of noise reduction, deinterlacing of image data, and image deblocking. According to another embodiment, deblocking performed by pre-processing module 210 may advantageously allow for mitigation of noise effects and small block boundary discontinuities due to artifacts in compressed video streams. Block artifacts in compressed video streams, such as pixel discontinuity between 8×8 pixel blocks create false fast edges unrelated to upscaled image content. Performing deblocking can aid in mitigating these effects. In certain embodiments, deblocking may not fully eliminate noise effects. Accordingly, the adaptive threshold value may be determined to select a small percentage (e.g., top 10%) of edges in each image for further consideration to eliminate noise effects and small block boundary discontinuities.

The pre-processed image data may then be received by spectrum analyzer module 215 and content adaptive sharpening module 220. In one embodiment, spectrum analyzer 215 may be configured to perform one or more of the functions including slope analysis, and determination of an adaptive threshold to provide one or more parameters for content adaptive sharpening module 220. In one embodiment, spectrum analyzer 215 may perform the functions of slope analyzer 105 and adaptive threshold module 110.

As shown in FIG. 2, spectrum analyzer 215 and content adaptive sharpening module 220 may be coupled to processor 225. Processor 225 may include one or more interfaces for coupling with spectrum analyzer 215 and content adaptive sharpening module 220. In one embodiment, spectrum analyzer 215 may provide data related to slope counting, window range, and pixel slope distribution to processor 225 via interface 235a.

In another embodiment spectrum analyzer 215 may further be configured to perform pixel based processing of received image data, wherein processor 225 performs spectrum estimation functions (e.g., spectrum estimation block 115). Spectrum analyzer 215 may be configured to perform slope analysis and adaptive threshold determination. Spectrum analyzer 215 may be configured to process pixels in a 9-pixel window centered on a current pixel. The window orientation may be programmed to be either horizontal or vertical. As will be discussed in more detail below with respect to FIG. 3, the spectrum analyzer may be configured to count pixel slopes within windows of the image data when two conditions are met: 1.) the range of the signal (e.g., max-min) in the window exceeds the adaptive threshold calculated for the image frame; and 2.) the height of the pixel slope centered in a window exceeds a predefined percentage.

Processor 225 may be configured to calculate an adaptive threshold for a current frame based on the window range histogram. Processor 225 may be configured to output adaptive threshold value via interface 235b to spectrum analyzer 215. Processor 225 may additionally be configured to process output of the slope analyzer 215 of spectrum analyzer 215 to generate output of control parameters to content adaptive sharpening module 220 via interface 235c. In one embodiment, control parameters may range between 0 and 1, with high values reflect true HD definition video content and low values corresponding to SD. Based on the image data and distribution data provided by spectrum analyzer 215, processor 225 may output configuration parameters to content adaptive sharpening module 220, which may then output enhanced image data at output 230. Output of processor interface 235c may be employed by a content adaptive enhancement module of a display device.

According to another embodiment, processor 225 may be configured to operate based on one or more instructions stored in memory 240, wherein memory 240 relates to one of ROM and RAM memory. Executable instructions and/or data received by processor 225 may be stored by memory 240.

According to one embodiment, content adaptive sharpening module 220 may be configured to perform content adaptive sharpening on received image data. For example, content adaptive sharpening module 220 may convert one or more luminance levels of an input signal based on a look-up table (LUT) matrix, wherein the LUT matrix is determined based on image data received for one or more frames. Device 200 may be configured to process one or more frames of the image data received. As used herein, a frame may relate to image data captured by an imaging device, such as a photosensor, camera, video detector, etc. A frame may also describe detection data for a particular period of time. Spectrum analyzer 215 may provide one or more coefficient values which may be employed to enhanced sharpening functions of the content adaptive sharpening module 220. Accordingly, image signals and/or data received on input 205 may be processed and output with enhanced dynamic range.

Figure 3A:
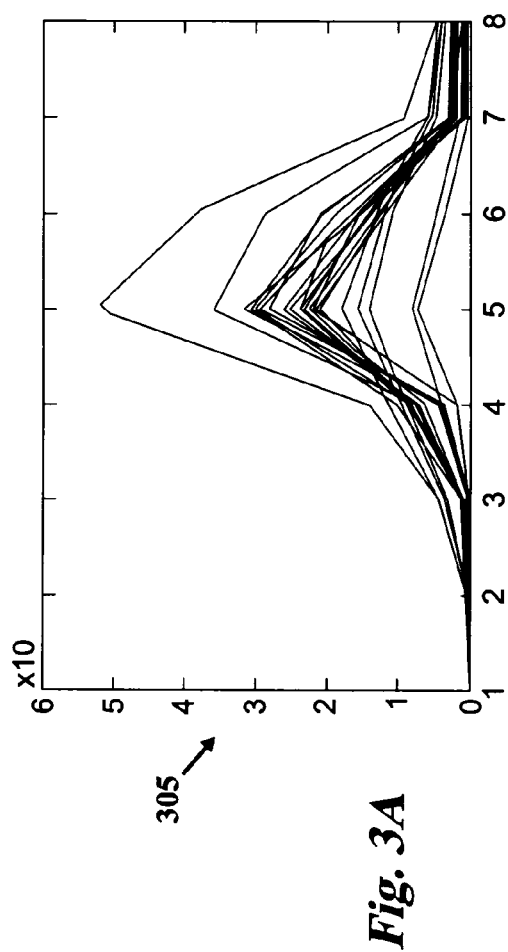
FIGS. 3A-3D depict a graphical representations of pixel distributions according to one or more embodiments of the invention.
Figure 3B:
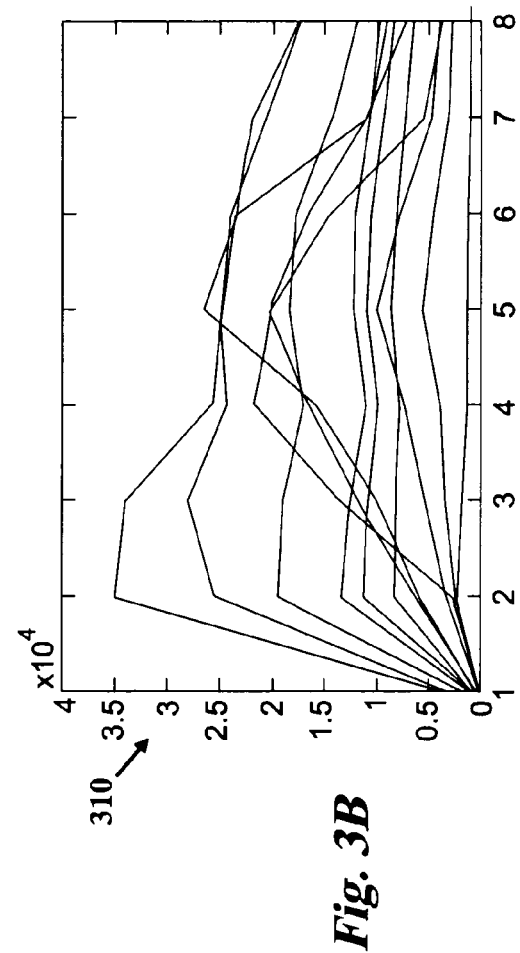
Figure 3C:
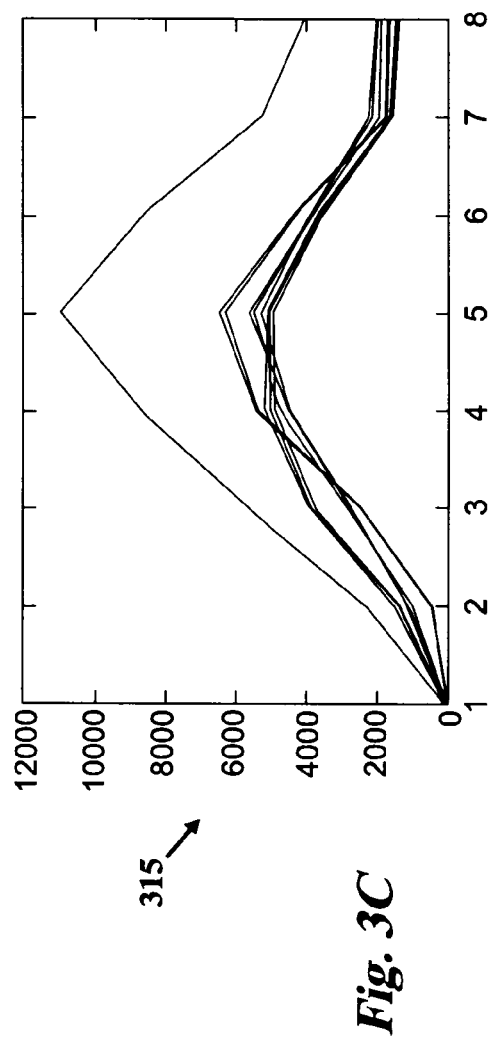
Figure 3D:
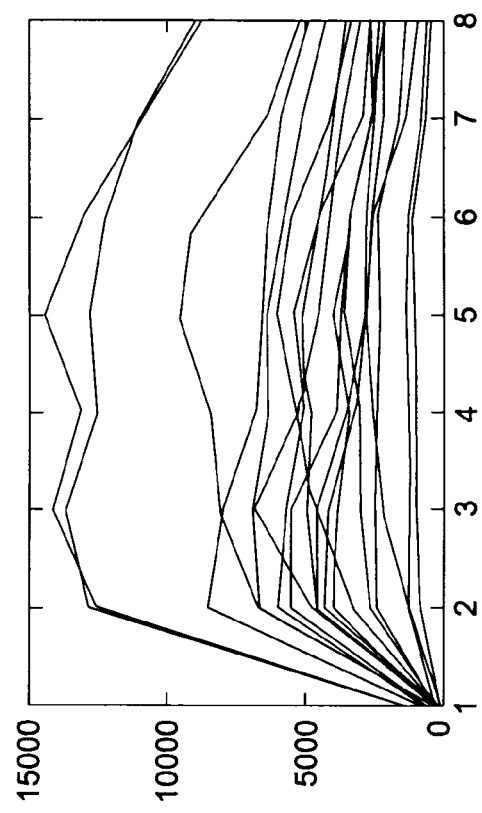

Referring now to FIGS. 3A-3D, graphical representations are depicted of pixel slope distributions according to one or more embodiments of the invention. The spectrum of an input signal may vary based on the type of image data and upscaling of the image data. According to one embodiment of the invention, FIGS. 3A-3D are exemplary representations of pixel slope distributions for exemplary input types. The pixel slope distributions include distributions of 1 pixel apart to 7 pixel apart slope distributions. In FIG. 3A, pixel slope distribution 305 relates to a pixel slope distribution for standard definition (SD) image data upscaled to high definition (e.g., 1080 line image resolution). In FIG. 3B, pixel slope distribution 310 relates to a pixel slope distribution for HD image data transmitted as HD (e.g., 1080 line image resolution). In FIG. 3C, pixel slope distribution 315 relates to a pixel slope distribution for upscaled SD image data transmitted as lower definition HD (e.g., 720 line image resolution). In FIG. 3D, pixel slope distribution 320 relates to a pixel slope distribution for HD image data transmitted as lower definition HD (e.g., 720 line image resolution). The pixel slope distributions may be analyzed by a slope analyzer (e.g., slope analyzer 105) to estimate spectral components of received image data.

Figure 4:
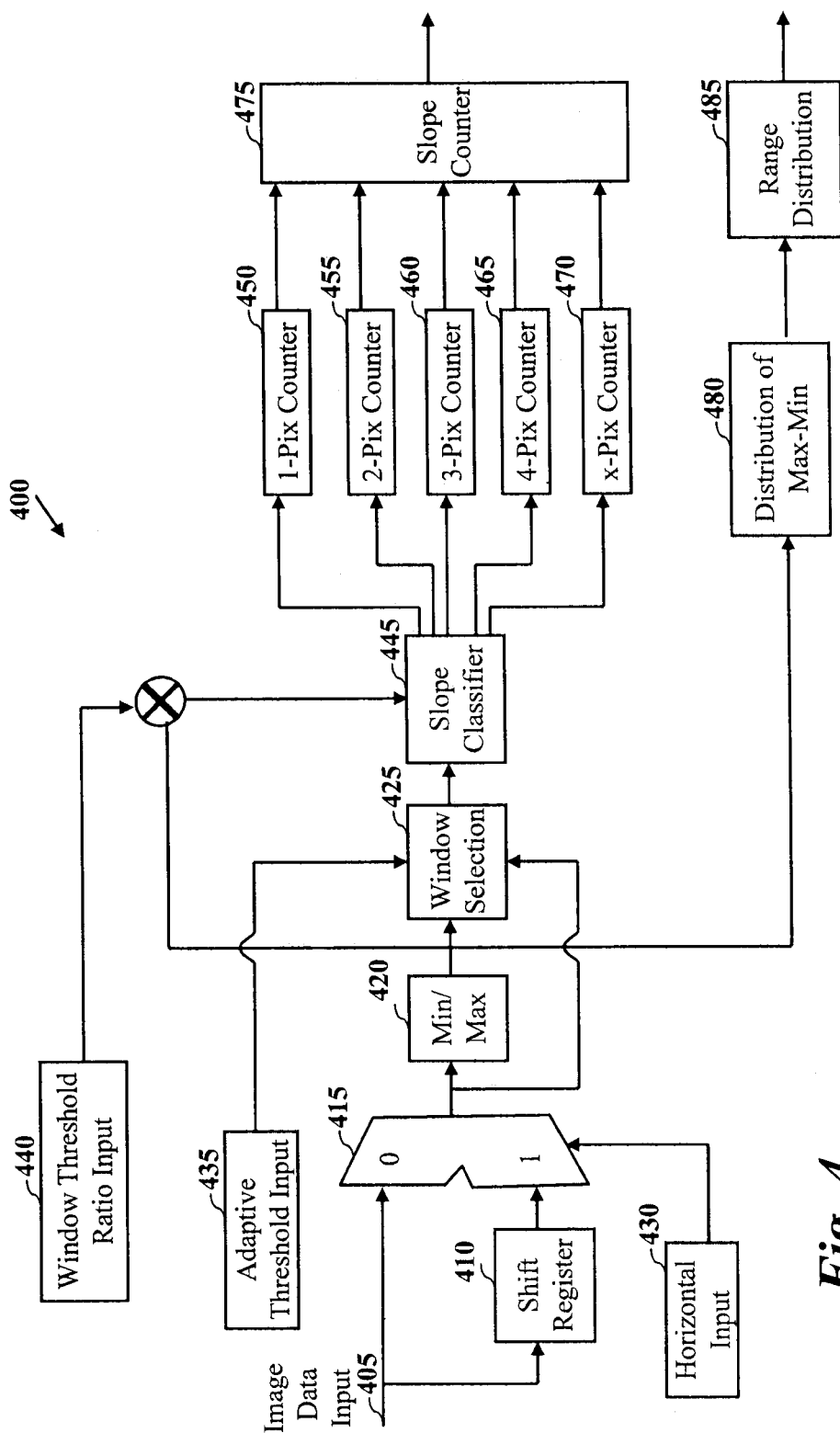
FIG. 4 depicts a simplified block diagram of a spectrum analyzer according to another embodiment of the invention.

Referring now to FIG. 4, a simplified block diagram is shown of a spectrum analyzer module input according to one embodiment of the invention. Spectrum analyzer module 400 (e.g., spectrum analyzer module 215) may be configured to output data to a processor (e.g., processor 225) for calculation of one or more control parameters based on image data received via input 405. Shift register 410 and multiplexer 415 may be configured to select output windows of pixel data based on output of horizontal input 430 to multiplexer 415. Horizontal module 430 may output signals based on data received by a processor (e.g., processor 225). Min/Max module 420 may be configured to determined maximum and minimum values in the pixel window. In one embodiment, the pixel values may relate to a nine (9) pixel horizontal or vertical window.

Window selection at block 425 may be based on controller input from adaptive threshold input 435. Window selection may help to keep certain windows for further processing whose range exceeds a threshold provided by adaptive threshold module 435. According to one embodiment, window selection module 425 may be configured to select a window of image data smaller than the image frame to mitigate the presence of HD network logos and/or graphics which may be overlaid on upscaled image data. The presence of overlaid HD content may cause the detection algorithm into classifying the entire image as HD image data. Based on a programmable detection window by window selection module 425, a window smaller than the image frame may be selected to exclude overlaid graphics.

Adaptive threshold module 435 may be provided by a processor (e.g., processor 225). In one embodiment, the adaptive threshold value for a subsequent frame of the image data may be based on the distribution of the window dynamic range values for a current frame for image data that substantially correlates with a previous frame.

Image data may then be passed to slope classifier 445 which may be configured to distribute determined slopes centered in the analysis window. Selection by slope classifier 445 may target the top 10% of windows according to their range. A higher percentage of windows can increase noise rejection but may lower distribution results. Slope classifier 445 may base the distribution of slope based on window threshold input 440. In one embodiment, an analysis window may be separated into five bins, wherein slope values may be distributed into the following categories:

Single-pixel slope is dominant (larger than dynamic threshold win)
Two-pixel slope is dominant
Three-pixel slope is dominant
4-pixel slope is dominant.

For each bin of the distribution, counters may determine slope counts. As shown in FIG. 4, 1-pix counter 450, 2-pix counter 455, 3-pix counter 460, 4-pix counter 465, and x-pix counter 470, accumulate slope counts for the five bins described above. Output of the pix counters may be provided to slope counter 475. Slope counter 475 may be configured to determine a number of slope values based on the output of the pix counters. In certain embodiments only a portion of the pix counter outputs may be used by spectrum analyzer module 400 to provide output parameters. By way of example, only 1-pix counter 450 and 2-pix counter 455 may be required to determine parameters for spectrum analyzing in one embodiment.

Distribution maximum/minimum (Max-Min) module 480 may be configured to track the frequency distribution of window dynamic range. Distribution max-min determination module 480 may calculate values for 65 bins to determine max and min values of the distribution. Range distribution module 485 may be configured to determine the pixel distribution range of image data. In certain embodiments, higher image contrast in a 9-pixel window will relate to larger values accumulated in higher distribution bins. In certain embodiments the first 32 bins of a distribution are expected to cover the significant distribution data and may be relevant to pixel determinations. Accordingly, range distribution module 485 may be configured to determine the range of bins.

Based on the output by slope counter 475 and range distribution module 485, a processor (e.g., processor 225) may be configured to determine one or more parameters for control of a content adaptive sharpening module (e.g., content adaptive sharpening 220). In one embodiment, the processor may define several sets of parameters covering a continuous range of spectrum utilization scenarios (e.g., from very flat upscaled SD to best quality HD). The processor may then map the continuous spectrum utilization coefficient based on the parameters sets to select a corresponding set of control parameters dynamically.

Spectrum estimation provide by system 400 may be combined with additional sources of information, including resolution and black bar presence detectors to produce more robust results. In an exemplary embodiment, the spectrum utilization coefficient can be limited to values larger than 0.3 when image resolution relates 720 line resolution, because upscaling cannot exceed 1.5×. Similarly, in another embodiment the coefficient cannot be lowered when black bars are present, which typically flags SD content.

Referring now to FIG. 5, a process is depicted for determining control parameters for enhancement of image data according to one embodiment of the invention. In one embodiment, process 500 may be performed by the signal spectrum analyzer of FIG. 1. Process 500 may be initiated by receiving image data for a first frame at block 505. An adaptive threshold value may then be calculated based on the image data at block 510. The adaptive threshold value may be employed to define a range threshold for image data of the pixel window. A range for one or more pixel windows may be determined by a min/module of the spectrum analyzer for selection of pixel windows with range values that exceed the adaptive threshold value. At block 515, a pixel distribution may be determined based on a pixel window of the image data. The pixel window may be selected based on the adaptive threshold value. In certain embodiments, the pixel distribution may be calculated based on a luma component of the image data. According to another embodiment, the pixel distribution may be calculated for fast and slow edges within a horizontal or vertical pixel window of image data.

Process 500 may continue by determining a spectrum estimation coefficient based on the pixel distribution at block 520, wherein the spectrum estimation coefficient is determined based on the spectral components of the image data. The spectrum estimation coefficient may relate to a scaling factor of the image data, such as a scaling factor of SD image data for transmission on an HD channel/broadcast. Lower coefficient values may be associated with standard definition image quality and higher values are associated with high definition image quality. In certain embodiments, the spectrum analyzer may be configured to limit a spectrum estimation coefficient when the pixel distribution indicates that image data relates to SD.

At block 525, one or more control parameters may be determined for enhancement of the image data based on the spectrum estimation coefficient. In one embodiment, image enhancement relates to content adaptive sharpening of image data. However, it should also be appreciated that control parameters may be determined for one or more different types of image processing to enhance image display. The one or more control parameters may relate to filtering parameters for sharpness enhancement of image data and may be provided to match filtering of a content adaptive sharpening device (e.g., content adaptive sharpening module 220) to the quality of the image data and spectrum utilization. The control parameters may further provide sharpness correction factors for upscaled image data.

Referring now to FIG. 6, a process is depicted for determining control parameters according to one embodiment of the invention. Process 600 may be performed by a processor (e.g., processor 225) of a content adaptive sharpening module and may be initiated by receiving slope counter values at block 605. Slope count may be based on output of a plurality of pixel counters (e.g., 1-pix count 450 and 2-pix count 455). A spectrum utilization coefficient may then be calculated at block 610 based on the received slope count. In one embodiment, calculation of the spectrum utilization coefficient may be based on calculation of percentages of the 1- and 2-pixel slope counts, limiting and normalizing of the result and derivation of the utilization coefficient. The processor may then calculate one or more control parameters at block 615. Control parameters may relate to values between 0 and 1, wherein a value of 0 corresponds to low quality SD images upscaled to 1080 lines, and a value of 1 corresponds to unsealed best quality true HD images. Intermediate values around the mid point may roughly correspond to SD images upscaled to 720, or 720 images upscaled to HD.

According to another embodiment, control parameters may be filtered to reduce variance. For example one or more of a first order recursive filter and peak tracking filter may be used. In one embodiment, the first order recursive filter may operate as an infinite impulse response (IIR) filter. In an exemplary embodiment the filter control parameter may be determined as follows:

$$hd\_c\_iir = hd\_c + 0.8*(hd\_c\_iir - hd\_c)$$

Alternatively a peak tracking filter may be employed based on a comparison of control parameters to a value associate with a peak value of the image data. Output of the peak filter may be more conservative (higher) than a simple recursive filter.

Figure 7A:
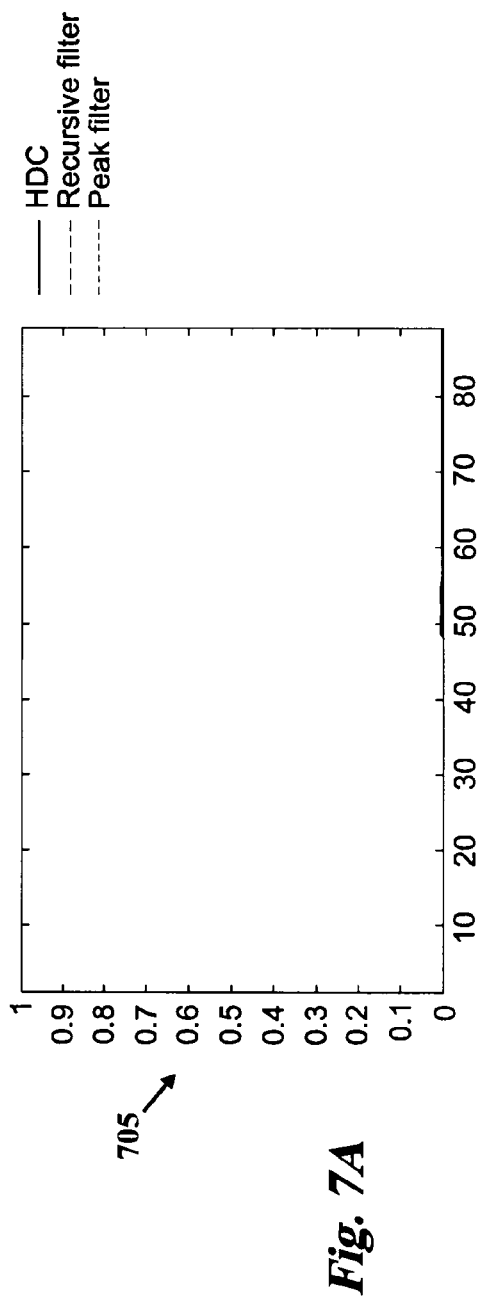
Figure 7B:
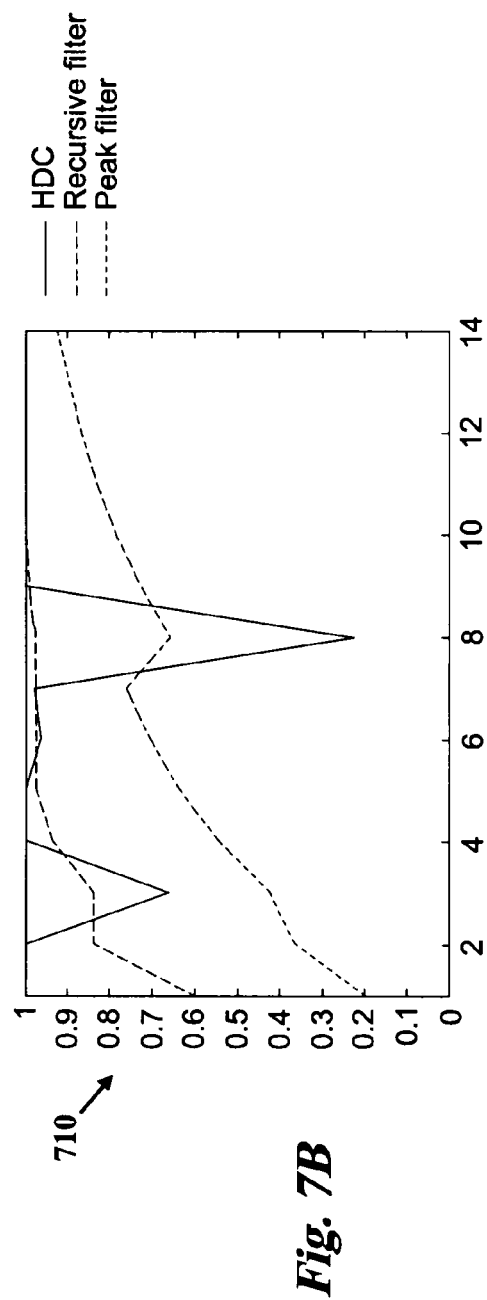

Referring now to FIGS. 7A-7D, graphical representations are depicted of control parameters determined for images data corresponding to the pixel slope distributions of to FIGS. 3A-3D, according to one or more embodiments. In FIG. 7A, control parameters are depicted for SD image data upscaled to HD (e.g., 1080 lines) based on pixel slope distribution 305. In FIG. 7B, control parameters 710 relate to a pixel slope distribution for HD image data transmitted as HD based on pixel distribution 310. In FIG. 7C, control parameters 715 relate to pixel slope distribution 315 for upscaled SD image data transmitted as lower definition HD (e.g., 720). In FIG. 7D, control parameters 720 relate to the pixel slope distribution 320 for HD image data transmitted as lower definition HD (e.g., 720). SD clips upscaled to 1080 yield consistently low results, while hi-def clips produce consistently high results.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for determining control parameters for image enhancement, the method comprising acts of:
receiving a plurality of image frames;

calculating an adaptive threshold value based on a dynamic range of a current image frame of the plurality of image frames and a dynamic range of a plurality of previous image frames prior to the current image frame;

determining whether a pixel slope distribution of a pixel window of image data of the current image frame exceeds the adaptive threshold value;

determining, responsive to a determination that the pixel slope distribution exceeds the adaptive threshold value, a spectrum estimation coefficient for the current image frame based on spectral components of the pixel slope distribution; and determining one or more control parameters for enhancement of the image data of the current image frame based on the spectrum estimation coefficient, the one or more control parameters relating to filtering parameters for adaptive enhancement of the image data of the current frame.

2. The method of claim 1, wherein the adaptive threshold value defines a range threshold for the image data of the pixel window.

3. The method of claim 1, wherein the pixel slope distribution is calculated based on a luma component for the image data of the current frame.

4. The method of claim 1, wherein the pixel slope distribution is calculated for fast and slow edges for one or more of horizontal and vertical pixel windows.

5. The method of claim 1, wherein the spectrum estimation coefficient relates to a scaling factor, wherein lower coefficient values are associated with standard definition image quality and higher values are associated with high definition image quality.

6. The method of claim 1, wherein image enhancement relates to one or more of content adaptive sharpening (CAS) and sharpness enhancement of the image data in the plurality of image frames.

7. The method of claim 1, wherein the one or more control parameters match filtering of a content adaptive sharpening device to a quality of image data and spectrum utilization of the current frame.

8. The method of claim 1, wherein the one or more control parameters provide sharpness correction factors for upscaled standard definition image data.

9. The method of claim 1, further comprising determining a range for one or more pixel windows and selecting pixel windows with range values that exceed the adaptive threshold value.

10. The method of claim 1, further comprising limiting the spectrum estimation coefficient when the pixel slope distribution indicates standard definition image data.

11. An apparatus to determine control parameters for image enhancement, the apparatus comprising:

at least one input terminal configured to receive a plurality of image frames;

an adaptive threshold module coupled to the input and configured to calculate an adaptive threshold value based on a dynamic range of a current image frame of the plurality of image frames and a dynamic range of a plurality of previous image frames prior to the current image frame;

a slope analyzer coupled to the input and configured to determine whether a pixel slope distribution of a pixel window of image data of the current image frame exceeds the adaptive threshold value; and a processor coupled to the input, adaptive threshold module and slope analyzer, the processor configured to:

determine, in response to a determination that the pixel slope distribution exceeds the adaptive threshold value, a spectrum estimation coefficient for the current image frame based on spectral components of the pixel slope distribution; and determine one or more control parameters for enhancement of the image data of the current image frame based on the spectrum estimation coefficient, the one or more control parameters relating to filtering parameters for adaptive enhancement of image data of the current image frame.

12. The apparatus of claim 11, wherein the adaptive threshold value defines a range threshold for the image data of the pixel window.

13. The apparatus of claim 11, wherein the pixel slope distribution is calculated based on a luma component for the image data of the current frame.

14. The apparatus of claim 11, wherein the pixel slope distribution is calculated for fast and slow edges for one or more of horizontal and vertical pixel windows.

15. The apparatus of claim 11, wherein the spectrum estimation coefficient relates to a scaling factor, wherein lower coefficient values are associated with standard definition image quality and higher values are associated with high definition image quality.

16. The apparatus of claim 11, wherein image enhancement relates to one or more of content adaptive sharpening (CAS) and sharpness enhancement of the image data in the plurality of image frames.

17. The apparatus of claim 11, wherein the one or more control parameters match filtering of a content adaptive sharpening device to a quality of image data and spectrum utilization of the current frame.

18. The apparatus of claim 11, wherein the one or more control parameters provide sharpness correction factors for upscaled standard definition image data.

19. The apparatus of claim 11, wherein the processor is further configured to determine a range for one or more pixel windows and selecting pixel windows with range values that exceed the adaptive threshold value.

20. The apparatus of claim 11, the processor is further configured to limit the spectrum estimation coefficient when the pixel slope distribution indicates standard definition image data.

* * * * *